Oct. 8, 1929.        H. S. LEWIS        1,730,515
SELF PROPELLED CORN POPPER
Filed Dec. 14, 1928        2 Sheets-Sheet 1

Inventor
HAROLD S. LEWIS
By Owen H. Spencer
Attorney

Patented Oct. 8, 1929

1,730,515

UNITED STATES PATENT OFFICE

HAROLD S. LEWIS, OF INDIANAPOLIS, INDIANA

SELF-PROPELLED CORN POPPER

Application filed December 14, 1928. Serial No. 325,953.

This invention relates to corn popping machines for either household or commercial use, and one feature of the invention is the simple and inexpensive manner in which the device is constructed and the adaptation of the same with any suitable heating medium.

A further feature of the invention is the provision of a revolving perforate cage for containing the corn to be popped and means associated therewith for utilizing the heat employed for popping the corn for rotating the cage.

A further feature of the invention is the provision of means for readily and easily dumping the corn after it is popped.

A further feature of the invention is the provision of baffle means for diffusing the flame out of direct contact with the corn and for catching the corn as it is discharged from the cage, said baffle means being readily removable from the popper frame.

Other objects and advantages will be hereinafter more fully set forth and pointed out in the accompanying specification.

In the accompanying drawings which are made a part of this application,

Figure 1:
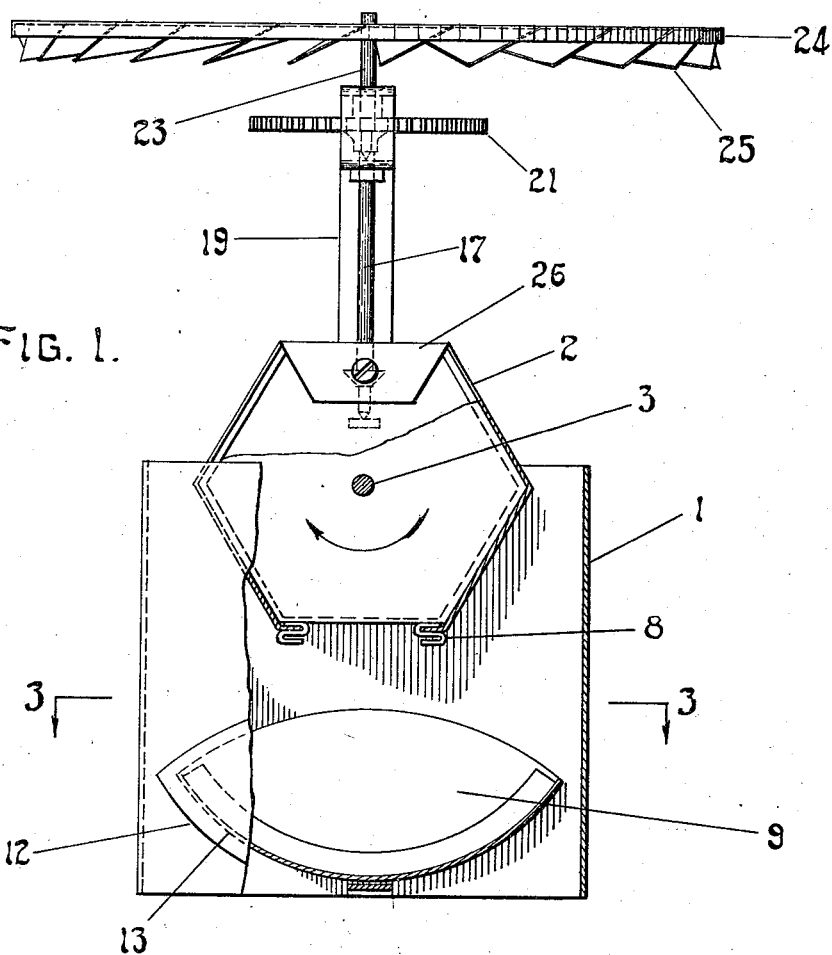
Figure 1 is an end elevation of the popper with parts broken out.

Referring to the drawings in which similar reference numerals designate corresponding parts thruout the several views, the numeral 1 indicates the frame of the popper, the side and end walls of which are preferably solid while the top and bottom ends thereof are open, so that heat and air may pass upwardly thru the frame and escape at the upper end thereof.

Mounted in the upper portion of the frame 1, is a cage 2, the walls of which are perforate, a shaft 3 extending longitudinally thru the cage and finding bearings in the end walls of the frame, one of the ends of the shaft having a circumferential groove 4 cut therearound to provide a knob 5, while a collar 6 is placed over the opposite end of the shaft between the end of the cage and the wall of the frame, said knob and collar limiting the longitudinal movement of the shaft. The frame 1 is preferably constructed of sheet metal, and the groove 4 rides on the edge of same in a suitable clearance hole therein, although it will be understood that other bearings for the ends of the shaft may be provided.

The cage 2 is preferably polygonal in cross section and one panel 7 thereof is made removable so that the corn may be entered into or removed from the cage, the panel 7 being slidably mounted in channels 8 so that it may be slid endwise to open or close the same.

Slidable thru one end wall of the frame 1 is an arcuate baffle pan 9, which extends to within the frame 1 thru one end thereof, but of less width than the frame, thus forming vent openings 10 at the inner end and at each side of the pan for the passage of heat, and as the pan is imperforate, more or less draft will be formed about said pan thru the frame from its lower to its upper end, and the heat will be more uniformly diffused to all parts of the frame and prevented from coming in direct contact with the corn.

Figure 3:
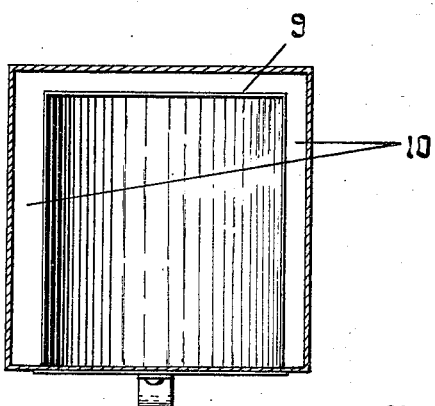
Figure 2:
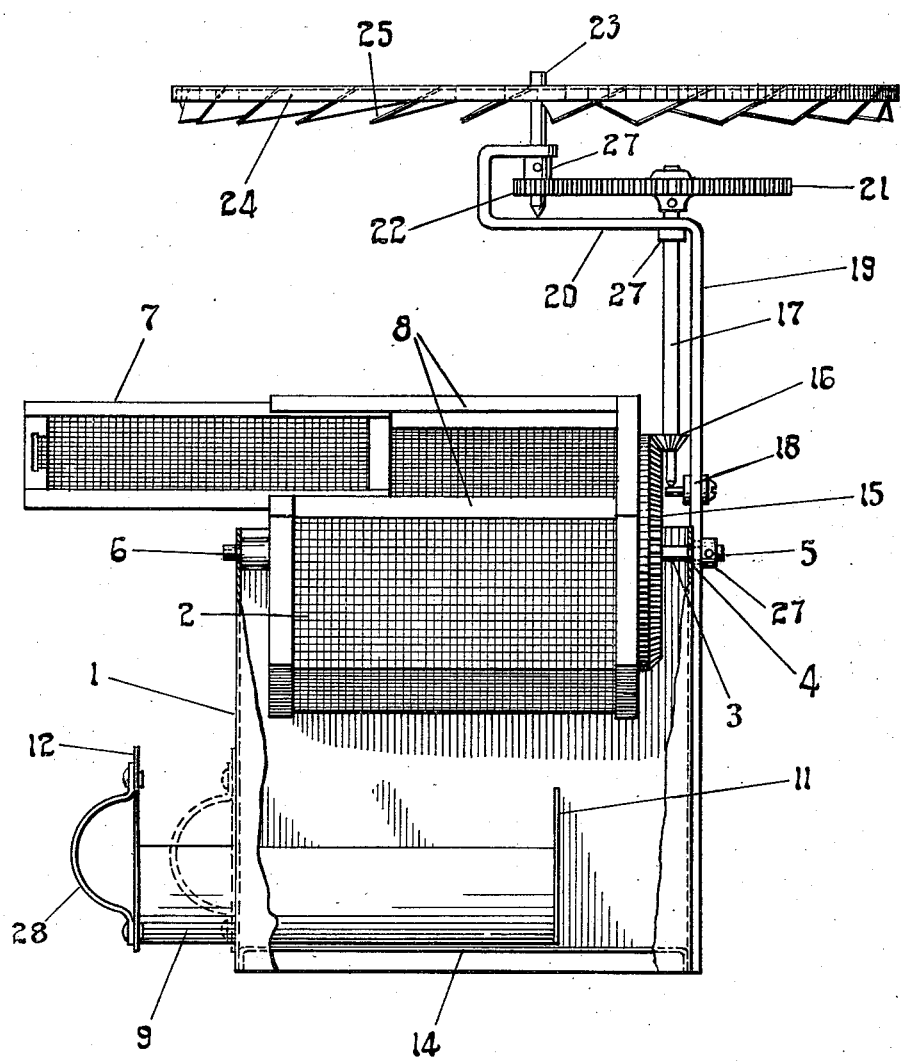
Figure 2 is a side elevation with parts broken away and parts in partial open position, and, Figure 3 is a sectional view as seen in the proximity of line 3—3, Fig. 1.

It will be observed from Fig. 3 that one of the two spaces 10, on the sides of the pan, is smaller than the other, so that when the popped corn is dumped from the cage 2, it will not fall thru into the flame. It being thus more appropriate to operate the removable panel 7 from this side of the apparatus.

The pan 9 is provided with flanges 11 and 12, the flange 12 being slightly larger than the opening 13 in the end wall of the frame so as to overlap the face of the end wall and prevent air passing thru the frame at this point. A brace bar 14 is preferably extended from end to end of the frame, near the lower end thereof for properly reinforcing the frame and supporting the pan.

In order to properly pop the corn it is necessary to agitate the same and to this end the cage 2 is to be revolved, and to automatically accomplish this result, a circular cog 15 is attached to one end of the cage 2, with which meshes a gear 16 carried by a vertical shaft 17. The lower end of the shaft 17 is pivotally mounted on a stud 18, carried by a bracket 19 at one end of the frame 1, while the upper portion of the shaft 17 is extended and forms a horizontal arm 20 of said bracket. The upper end of the shaft 17 has a gear wheel 21 mounted thereon, which meshes with a pinion 22 on a stub shaft 23 which is joined in an upwardly extending hook formation on the arm 20. To the upper end of the shaft 23 is attached a fan structure or air mill 24, the blades 25 of which are so arranged that the heat and expanding air passing upwardly thru the frame 1, will impart rotating motion to the fan structure and thru the various gears and shafts impart rotating motion to the cage 2.

As best shown in Fig. 1, the cage 2 is so mounted in the frame 1, that the upper portion of the cage will extend a distance above the upper edge of the frame so that the panel 7 may be readily slid endwise to open or close the cage 2.

In operation, the cage 2 is manually rotated until the panel 7 is above the upper end of the frame 1, when the panel 7 is removed and the proper amount of corn to be popped entered in the cage, after which the panel is again closed. The popper is then placed over any suitable heating medium (not shown), preferably a gas flame or the like, the heat arising therefrom passing upwardly thru the frame 1, causing a draft or suction at the lower end of the frame and drawing a certain amount of air into the frame, which, when commingled with the heat, intensifies the heating qualities, and driving action thereof.

Counterweight means 26 is provided on the opposite side of the cage 2, from the panel 7 to counteract the weight of same and keep said cage balanced for easy rotation.

The heat arising thru the frame 1, thoroughly pops the corn within the cage 2 and also sets up rotation of the fan structure 24, which results in rotating the cage 2 and agitating the corn in such manner that it will be uniformly popped and prevented from burning.

As soon as the corn within the cage has been properly popped, the panel 7 is again removed and the cage turned until the corn will descend into the pan 9, after which, the pan is removed from the frame 1 and the contents thereof emptied into any suitable receptacle. A new supply of corn is then placed in the cage 2 and the panel returned to position in the channels 8, when the popping operation may be repeated.

Conventional collars 27 are provided on the shafts 3, 17 and 23 to assist in the longitudinal confinement of same, as will be understood by those familiar with the art.

The pan 9 is operated in drawer-manner by the ordinary handle 28 which is secured to the flange 12.

While the description and drawings illustrate in a general way certain instrumentalities which may be employed in carrying the invention into effect, it is evident that many modifications may be made in the various details, without departing from the scope of the appended claims, it being understood that the invention is not restricted to the particular example herein described.

I claim as my invention:

1. In a horizontally disposed corn popping machine, a corn receiving cage formed of panels one of which is longitudinally slidable for opening or closing said cage; a frame open from end to end to form a passage for heat therethru; means for mounting said cage in said frame and cause a portion of said cage to project above the frame; means at one open end of said frame adapted to be rotated by the heat passing thru said frame; and means for utilizing said rotating means for imparting rotation to said cage.

2. In a corn popping machine, a corn receiving cage polygonal shaped in cross section one panel of which is longitudinally movable means for entering corn into or removing the same from said cage; means for conveying heat to said cage for popping the corn therein; and means for utilizing the heat employed for popping the corn for rotating said cage.

3. In a corn popping machine, a hollow frame adapted for conducting heat therethru; a rotating cage mounted in said frame; means for utilizing the heat passing thru said frame for imparting rotation to said cage; and a combined baffle and corn receiving means below said cage.

4. In a corn popping machine, a hollow heat conducting frame; a corn receiving cage rotatable in said frame; means for entering or removing corn therefrom; a pan-like baffle below said cage adapted to receive the popped corn when dumped from said cage and arranged to form restricted passages for the heat passing thru said frame.

5. In a corn popping machine, a frame arranged for conveying heat therethru; a corn receiving cage mounted in said frame in the path of the heat passing therethru; a removable pan-like baffle below said cage adapted to prevent direct contact of the heat with the corn and receive the corn after it is popped; and means operated by the heat passing thru said frame for imparting rotating action to said cage.

6. In a corn popping machine, a hollow frame for conveying heat therethru; a rotating perforate corn receiving cage in said frame; means for entering or removing corn from the cage; a pan-like baffle for directing the heat out of direct contact with the corn in the cage to prevent burning thereof and for receiving the popped corn; a rotatably mounted fan structure in line with the heat passing thru said frame and rotatable by the passage of the heat therethru; and gear means between said fan structure and cage for imparting rotation to said cage when the fan structure is rotated.

In testimony whereof, I have hereunto set my hand on this the 11th day of December, 1928, A. D.

HAROLD S. LEWIS.